(No Model.)

L. H. SNYDER.
HOSE CONNECTION.

No. 548,932.  Patented Oct. 29, 1895.

Witnesses
G. W. Stipek
O. D. Loomis Jr.

Inventor
Lyman H. Snyder
By James Shepard
Atty.

UNITED STATES PATENT OFFICE.

LYMAN H. SNYDER, OF SOUTHINGTON, CONNECTICUT.

HOSE CONNECTION.

SPECIFICATION forming part of Letters Patent No. 548,932, dated October 29, 1895.

Application filed November 30, 1894. Serial No. 530,341. (No model.)

*To all whom it may concern:*

Be it known that I, LYMAN H. SNYDER, a citizen of the United States, residing at Southington, in the county of Hartford and State of Connecticut, have invented certain new and useful Improvements in Hose Connections, of which the following is a specification.

My invention relates to improvements in hose connections; and the chief objects of my improvement are simplicity and economy in production and general convenience and efficiency of the article.

Figure 1:
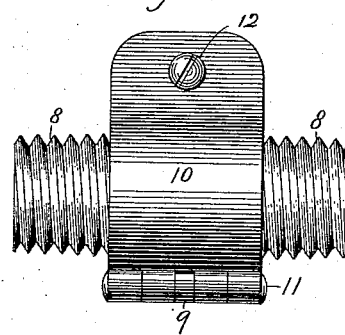
Figure 2:
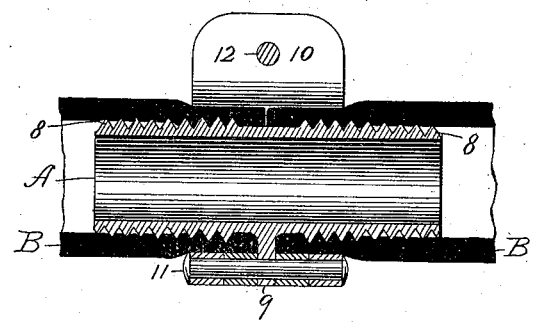
Figure 3:
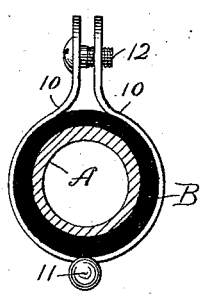
Figure 4:
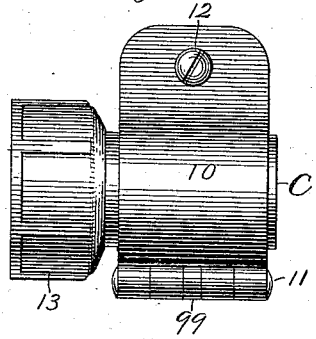
Figure 5:
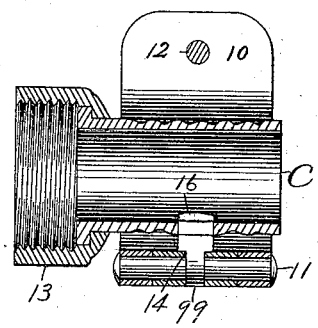
Figure 6:
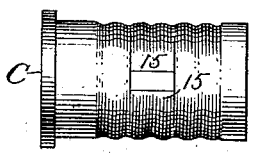
Figure 7:
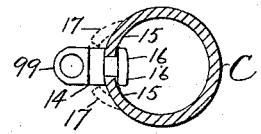

In the accompanying drawings, Figure 1 is a side elevation of my hose connection in a form adapted for merely mending or splicing hose. Fig. 2 is a central longitudinal section of the same, together with two pieces of hose. Fig. 3 is a transverse section of the same on a plane immediately by the side of the clamp. Fig. 4 is a side elevation of my connection in a form adapted for use with the ordinary screw-coupling. Fig. 5 is a central longitudinal section of the same, some of the parts being shown in elevation. Fig. 6 is a detached side elevation of the coupling-tube; and Fig. 7 is a transverse section of said tube, together with a side elevation of the hinge-lug for my clamp.

In the form shown in Figs. 1, 2, and 3 I use a connecting-tube A, open at both ends and having on its periphery suitable ridges and grooves, preferably in the form of screw-threads 8, while said tube tapers toward each end. At the middle portion I form a hinge-lug 9, which may be cast in one and the same piece with the tube or attached thereto in any proper manner. Upon the lug I secure the two members 10 of a hinged clamp, the pintle 11, by which said members are hinged together, passing through the hinge-lug 9, and thereby securing the clamp thereto. The ends of the clamp opposite the hinge may be drawn together and held in place by any ordinary means—as, for example, by means of the clamp-screw 12, which passes loosely through one member of the clamp and screws into the other member thereof, as best shown in Fig. 3.

In order to mend or splice a hose with this connection, the clamp-screw may be removed, so that the two members 10 of the clamp may be opened or swung back out of the way. The hose ends B B are then forced over the ends of the connecting-tube A until they meet or nearly meet, the hinge-lug 9 being between said hose ends. The two members of the clamp are then brought together and secured to firmly clasp the hose ends and bind them tightly upon the connecting-tube, as shown.

When it is desired to use my connection with the ordinary screw-coupling, it is only necessary to secure the clamp and hinge-lug to the coupling-tubes. The coupling-tube having the male thread may have the hinge-lug cast thereon the same as in the connecting-tube A, so that I consider it unnecessary to illustrate that part of the screw-coupling. The female part 13 of the ordinary screw-coupling is swiveled on the coupling-tube C, and therefore it is necessary to pass the body of said tube through said part 13. A hinge-lug cast on said tube would prevent the tube C and part 13 from being thus assembled. Hence I provide for the subsequent attachment of the hinge-lug 99. This lug may be attached by any ordinary means, as by riveting or screwing it in; but I prefer to cast the tube C with a recess to receive said lug. The lug may have a shoulder 14 for resting on the outer surface of the tube C and one or two flanges 16 for resting against the inner surface of said tube. The tube may also be provided with wings or lugs 15 at each side of the lug-receiving recess, which wings, as first cast, may stand outwardly, as indicated by broken lines at 17 in Fig. 7, so that the lug 99 may be first passed endwise between said wings, after which the wings are bent down to correspond with the rest of said tube with their ends between the shoulder and flange of said lugs, as best shown in Fig. 7. The clamp hinged upon said hinge-lug is the same as before described, and its parts are given the same reference-numerals as in the construction first described.

The hose is connected in the manner before described, excepting that the hose end is slit for a short distance to let the extreme end pass said lug and come nearer to the part 13, and only one hose end is secured to each tube.

I claim as my invention—

1. A tube for insertion within a hose end, a hinge lug carried by said tube and a hinged clamp consisting of two members both of which are hinged to said lug by means of a single pintle, substantially as described and for the purpose specified.

2. A tube for insertion within a hose end, a hinge lug carried by said tube and a clamp, the two members of which are secured to said lug, said clamp and tube extending beyond the opposite sides of said lug in the longitudinal direction of said tube, substantially as described and for the purpose specified.

3. A tube for insertion within a hose-end having the female part 13 of a screw coupling swiveled thereon, a separately formed and attached hinge lug projecting directly from the body of said tube, and secured thereto a clamp, composed of two members arranged to swing on a hinge whose axis is parallel to said tube, substantially as described and for the purpose specified.

LYMAN H. SNYDER.

Witnesses:
 MARCUS H. HOLCOMB,
 THOS. F. WELCH.